United States Patent
Su et al.

(10) Patent No.: US 9,323,016 B2
(45) Date of Patent: Apr. 26, 2016

(54) BI-DIRECTIONAL DATA TRANSMISSION METHOD, HIGH-FREQUENCY CONNECTOR AND OPTICAL CONNECTOR USING THE SAME

(71) Applicant: NEXTRONICS ENGINEERING CORP., New Taipei (TW)

(72) Inventors: Hou-An Su, Keelung (TW); Chi-Jung Chan, New Taipei (TW); Hung-Wei Hsu, Taipei (TW)

(73) Assignee: NEXTRONICS ENGINEERING CORP., New Taipei (TW)

( * ) Notice: Subject to any disclaimer, the term of this patent is extended or adjusted under 35 U.S.C. 154(b) by 297 days.

(21) Appl. No.: 14/047,060

(22) Filed: Oct. 7, 2013

(65) Prior Publication Data
US 2015/0016782 A1 Jan. 15, 2015

(30) Foreign Application Priority Data
Jul. 11, 2013 (TW) .............................. 102124888 A

(51) Int. Cl.
*G02B 6/42* (2006.01)
(52) U.S. Cl.
CPC .............. *G02B 6/4279* (2013.01); *G02B 6/428* (2013.01); *G02B 6/4246* (2013.01); *G02B 6/4284* (2013.01)

(58) Field of Classification Search
CPC .... G02B 6/4279; G02B 6/428; G02B 6/4281; G02B 6/4283; G02B 6/4284; H01R 12/515
See application file for complete search history.

(56) References Cited

U.S. PATENT DOCUMENTS

| 8,360,789 B2* | 1/2013 | Yin ........................ H01R 12/52 439/66 |
| 2011/0031379 A1* | 2/2011 | Ishigami .............. G02B 6/4292 250/216 |

* cited by examiner

*Primary Examiner* — Michelle R Connelly
(74) *Attorney, Agent, or Firm* — Li & Cai Intellectual Property (USA) Office

(57) ABSTRACT

The instant disclosure relates to bi-direction data transmission method, high-frequency connector and an optical connector using the same. The optical connector includes a first circuit board, a second circuit board, a high-frequency connector and an optical fiber cable. One optical engine is set on the first circuit board. The high-frequency connector is set between the first circuit board and the second circuit board for connecting both two circuit boards. The high-frequency connector includes an insulation base. The insulation base has at least one terminal-accommodating region. Pluralities of connection terminals are inserted into the terminal-accommodating regions of the insulation base. The optical fiber cable connects to the one optical engine.

18 Claims, 11 Drawing Sheets

BI-DIRECTIONAL DATA TRANSMISSION METHOD, HIGH-FREQUENCY CONNECTOR AND OPTICAL CONNECTOR USING THE SAME

BACKGROUND OF THE INVENTION

1. Field of the Invention

The present disclosure relates to a high-frequency connector, an optical transceiver and a bi-directional data transmission method using the same; in particular, to an optical transceiver which transmits data through a combination of a high frequency connector an optoelectronic module, reducing the production cost and improving the production quality.

2. Description of Related Art

The term connector is a general reference to connecting units and accessories thereof for transferring electrical signals and power. As bridges for signals, connectors are essential to operation of electronic systems and their qualities dictate reliability of transmission of electric current and signals. Given the trend for faster and miniaturized electronic products, current connectors are mostly high speed interfaces such as mini SAS HD, PCI express, InfiniBand, SerialATA, Serial SCSI, DVI, HDMI, etc. Due to significant increase in demands for communication and data transmission quantity, traditional coaxial cables no longer serve as viable transmission medium. Consequently, optical fibers are used as transmission medium. The specifications of Mini SAS HD can be categorized as copper cables, AoC cable connector (non-dismantleable), and MPO cable connectors (dismantleable). Referring to FIG. 1, a connector 10' having the specification of a conventional Mini SAS HD mainly includes a first circuit board 101' and a second circuit board 102'. The first circuit board 101' and the second circuit board 102' respectively have a first optical engine 1011' and a second optical engine 1021'. The first optical engine 1011' and the second optical engine 1021' are respectively connected to optical fibers 11', 12' (the optical fibers can be single-core or multi-core). The first circuit board 101' and the second circuit board 102' are respectively formed with a first data transmission port 1012' and a second data transmission port 1022'. The first circuit board 101' and the second circuit board 102' are disposed in a connector head. The above steps form a complete connector 10'. The connector 10' can be plugged between corresponding data transmission equipment for data transmission. As mentioned above, the first circuit board 101' and the second circuit board 102' of the connector 10' need to have respectively an optical engine 1011' and an optical engine 1021'. However, the optical engine and the optical fiber are main components of the connector 10' and incur a large portion of the production cost. In order to solve the abovementioned problem, the industry has developed a connector as shown in FIG. 2. In the connector 10', the rear end of the first circuit board 101' and the rear end of the second circuit board 102' are connected to a single optical engine 1011' by two FPC flexible cables 13', 14' for data transmission. However, when the amount of data transmission is greatly increased, the limited transmission speed of the FPC flexible cables 13' 14' cannot be used in high frequency transmission. Additionally, the FPC flexible cables 13', 14' need to be soldered to surface contacts on the rear ends of the first circuit board 101' and the second circuit board 102'. The extensions of the first circuit board 101' and the second circuit board 102' comprising the surface contacts increases production cost, and the soldering quality can also be problematic. Also, data can be transmitted in the connector 10' of FIG. 1 and FIG. 2 along only the surface circuit of the first circuit board 101' and the second circuit board 102'. Therefore, the circuit design of the first circuit board 101' and the second circuit board 102' is restricted, which in turn limits the field of application.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

The object of the present disclosure is to provide a high frequency connector, an optical connector, and a bi-directional transmission method using the same, in which a single high frequency connector connects two circuit boards and data are transmitted through a single optical engine.

In order to achieve the aforementioned objects, the present disclosure provides an optical connector applied to an input/output connector for bi-directional transmission of data. The output/input connector includes a first set of terminals and a second set of terminals. The optical connector includes: a connector head having an accommodating space and formed with an opening end and an assembly end; a first circuit board disposed in the accommodating space and having a plurality of first contacts disposed at its end proximal to the opening end for connection with the first set of terminals, and an optical engine disposed at its other end proximal to the assembly end; a second circuit board disposed in the accommodating space and having a plurality of second contacts disposed at its end proximal to the opening end for connection with the second set of terminals; a high frequency connector disposed between the first circuit board and the second circuit board and having an insulation base which has a peripheral side surface and a first terminal face and a second terminal face opposite each other, wherein the side surface is adjacent to the first terminal face and the second terminal face, the first terminal face and the second terminal face have at least one terminal-accommodating region therebetween, and a plurality of connection terminals passes through the corresponding terminal-accommodating regions; and an optical fiber passing through the assembling end of the connector head and connected to the optical engine.

The present disclosure also provides a high frequency connector disposed between the first circuit board and the second circuit board of an optical connector. The first circuit board has an optical engine electrically connected to an optical fiber. The high frequency connector includes: an insulation base which has a side surface and a first terminal face and a second terminal face opposite each other, wherein the side surface is adjacent to the first terminal face and the second terminal face, the first terminal face and the second terminal face have at least one terminal-accommodating region therebetween; and a plurality of connection terminals passing through the corresponding terminal-accommodating regions.

The present disclosure further provides a bi-directional transmission method including: providing an optical connector having a first circuit board, a second circuit board and a high frequency connector electrically connected between the first circuit board and the second circuit board, an output/input connector having a first set of terminals and a second set of terminals, wherein a plurality of first contacts of the first circuit board is electrically connected to the first set of terminals, a plurality of second contacts of the second circuit board is electrically connected to the second set of terminals, a plurality of connection terminals passes through the high frequency connector; a first signal transmission path which uses the first contacts of the first circuit board to receive electrical signals from the first set of terminals, sends the electrical signals to an optical engine of the first circuit board, uses the optical engine to convert the electrical signals into optical signals, and sends the optical signals to an optical fiber, and at the same time, receives optical signals from the optical fiber, sends the optical signals to the optical engine which converts the optical signals into electrical signals, and sends the electrical signals through the first contacts to the first set of terminals; and a second signal transmission path which uses the second contacts of the second circuit board to receive electrical signals from the second set of terminals, sends the electrical signals to the high frequency connector, uses the high frequency connector to send the electrical signals to the optical engine of the first circuit board at a high speed, uses the optical engine to convert the electrical signals into optical signals, and sends the optical signals to an optical fiber, and at the same time, receives optical signals from the optical fiber, sends the optical signals to the optical engine which converts the optical signals into electrical signals, uses the high frequency connector to send the electrical signals to the second contacts of the second circuit board at a high speed, and sends the electrical signals to the second set of terminals; wherein, electrical signals from the first set of terminals and the second set of terminals are all sent to a single optical engine, and the first signal transmission path and the second signal transmission path have the same length.

The present disclosure has the following advantages. By connecting the two circuit boards through the high frequency connector, a single optical engine is used and production cost is reduced. Moreover, the difficulty of quality control is also reduced. Additionally, by connecting the two circuit boards through a high frequency connector, signals can be transmitted not only on the outer surfaces of the two circuit boards, but also on the inners sides of the two surfaces, greatly increasing the printing space of the two circuit boards, providing a more flexible printing condition.

In order to further the understanding regarding the present disclosure, the following embodiments are provided along with illustrations to facilitate the disclosure of the present disclosure.

DETAILED DESCRIPTION OF THE PREFERRED EMBODIMENTS

Unless otherwise specified, the present disclosure is not limited to the amounts and quantities mentioned in the following embodiments. The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 3:
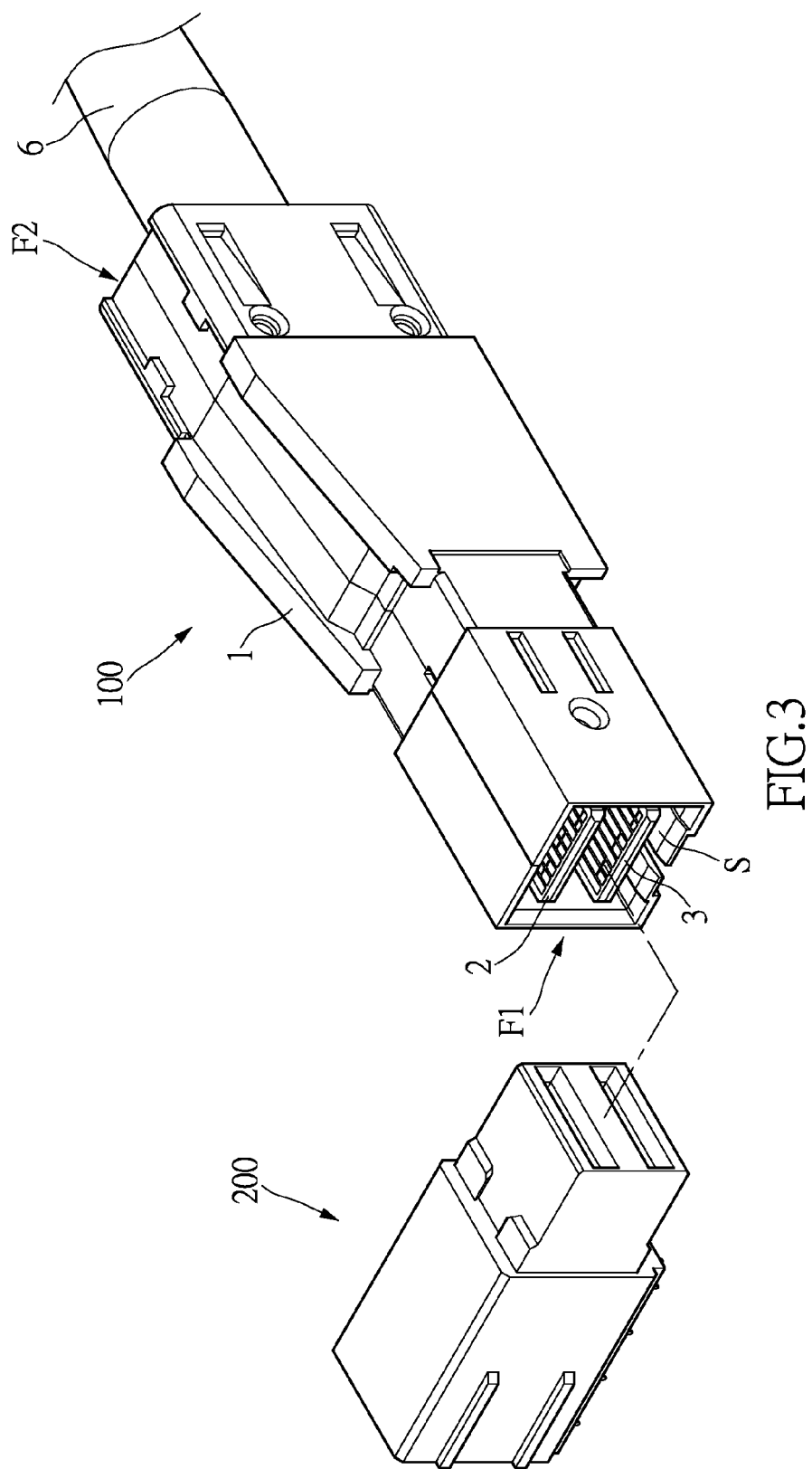
FIG. 3 shows a perspective view of a non-mated assembled optical connector according to the present disclosure.

Referring to FIG. 3, the present disclosure provides an optical connector 100 for transmitting and receiving optical signals. The optical connector transmits data in a bi-directional manner with an output/input connector 200. The output/input connector 200 is installed on a main engine (not shown in the figure) such as but not limited to a server or an industrial computer having a need for transmitting/saving large amount of data. The optical connector 100 transmit and receive data at different speeds, including but not limited to one gigabit per second, two gigabits per second, 2.5 gigabits per second, four gigabits per second, eight gigabits per second, ten gigabits per second, and even higher speeds. Additionally, the optical connector can transmit and receive optical signals of different wavelengths, including but not limited to wavelengths of 850 nanometers, 1310 nanometers, 1470 nanometers, 1490 nanometers, 1510 nanometers, 1530 nanometers, 1550 nanometers, 1570 nanometers, 1590 nanometers and 1610 nanometers. Additionally, the optical connector 100 can support different types of transmission methods, including but not limited to fast Ethernet, gigabit Ethernet, ten gigabit Ethernet, and 1×, 2×, 4× and 10× fiber channels.

Figure 4:
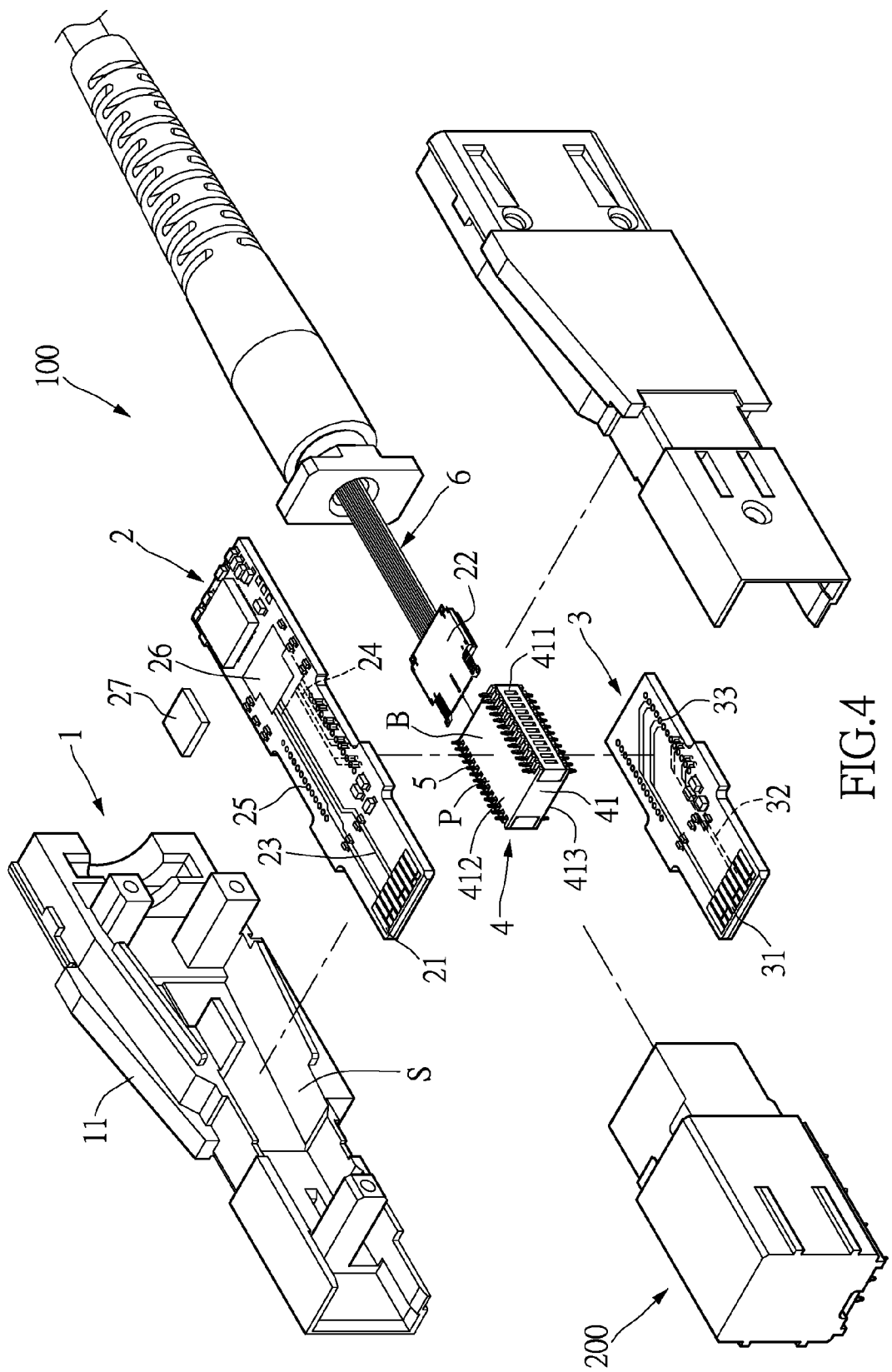
FIG. 4 shows a perspective exploded view of a non-mated assembled optical connector according to the present disclosure.

Referring to FIG. 3 and FIG. 4, the optical connector of the present disclosure mainly has a connector head 1, a first circuit board 2, a second circuit board 3, a high frequency connector 4 and an optical fiber cable 6. The connector head 1 is hollow and has an accommodating space S, for accommodating the first circuit board 2 and the second circuit board 3. The two ends of the accommodating space S are respectively an assembly end F2 and an opening end F1. The opening end F1 can mate with an output/input connector 200. The optical fiber cable 6 can connect to an optical engine 22 of the first circuit board 2 through the assembly end F2. As shown in FIG. 4, the first circuit board 2 can be a printed circuit board (PCB), one end of the first circuit board 2 has a plurality of first contacts 21 (namely an edge connector) proximal to the opening end F1, and the other end of the first circuit board 2 has an optical engine 22 proximal to the assembly end F2. The optical engine completely connects to an optical fiber cable 6 (single or multi-cored) such that the optical engine can use the optical fiber cable 6 for bi-directional data transmission. The second circuit board 3 can also be a printed circuit board (PCB), one end of the second circuit board 3 has a plurality of second contacts 31 (namely an edge connector) proximal to the opening end F1, and a high frequency connector 4 connects the second circuit board 3 to the first circuit board 2.

The high frequency connector 4 of the optical connector 100 provides transmission of data between the first circuit board 2 and the second circuit board 3. Specifically, the high frequency connector 4 includes an insulation base 41 having a side surface 411 and a first terminal face 412 and a second terminal face 413 opposite each other. The side surface 412 is adjacent to the first terminal face and the second terminal face 413. The first terminal face 412 and the second terminal face 413 have at least one terminal-accommodating region P therebetween, and a plurality of connection terminals passes through the corresponding terminal-accommodating regions. By this configuration, the first circuit board 2 and the second circuit board 3 can transmit data between them through the connection terminals.

Figure 1:
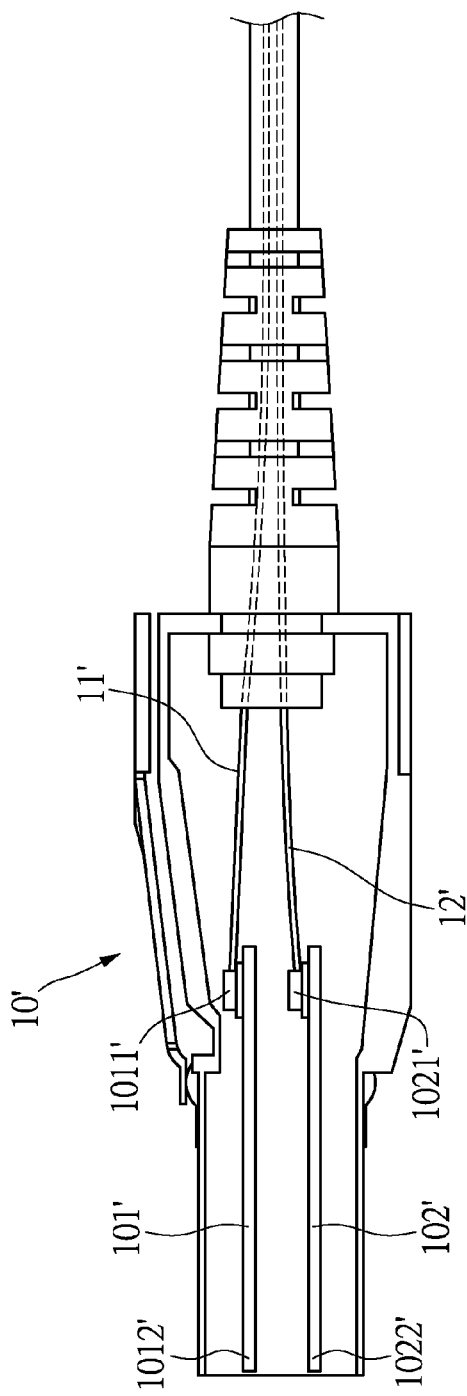
FIG. 1 shows a schematic diagram of a conventional optical connector.
Figure 2:
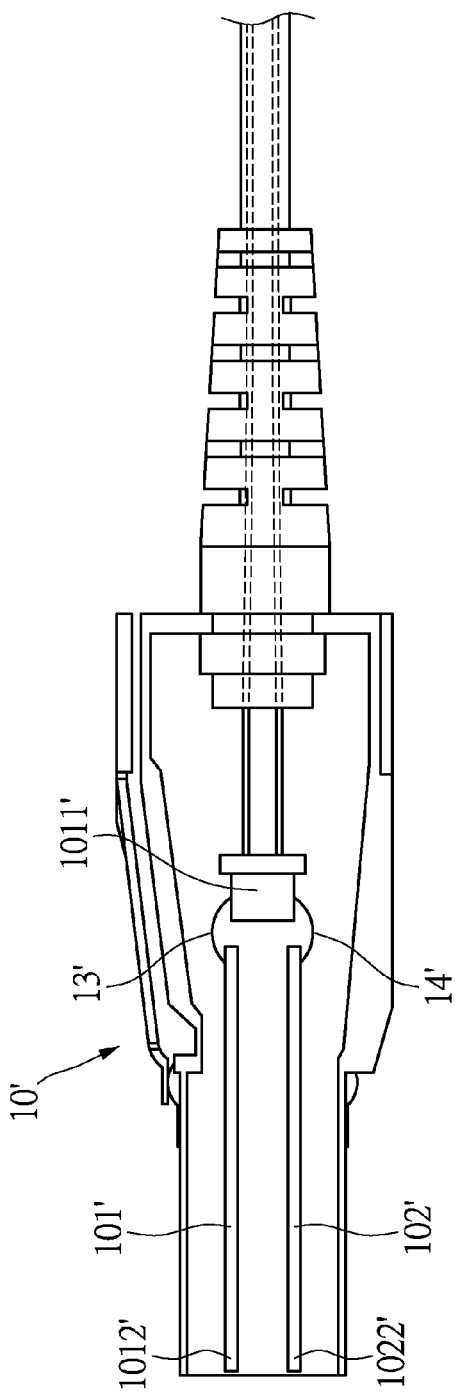
FIG. 2 shows a schematic diagram of another conventional optical connector.
Figure 5:
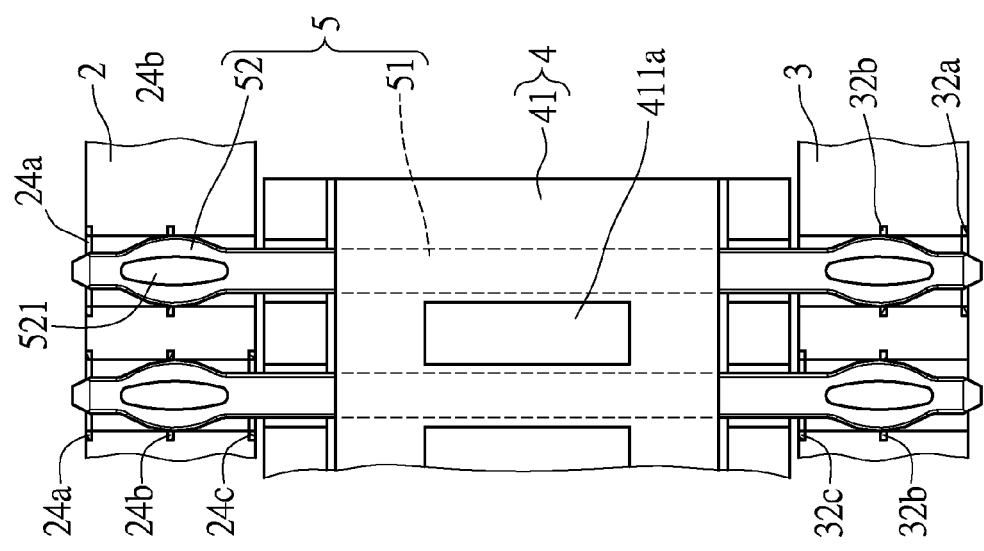
FIG. 5 shows an enlarged side cross-sectional view of a mated optical connector according to the present disclosure.
Figure 6:
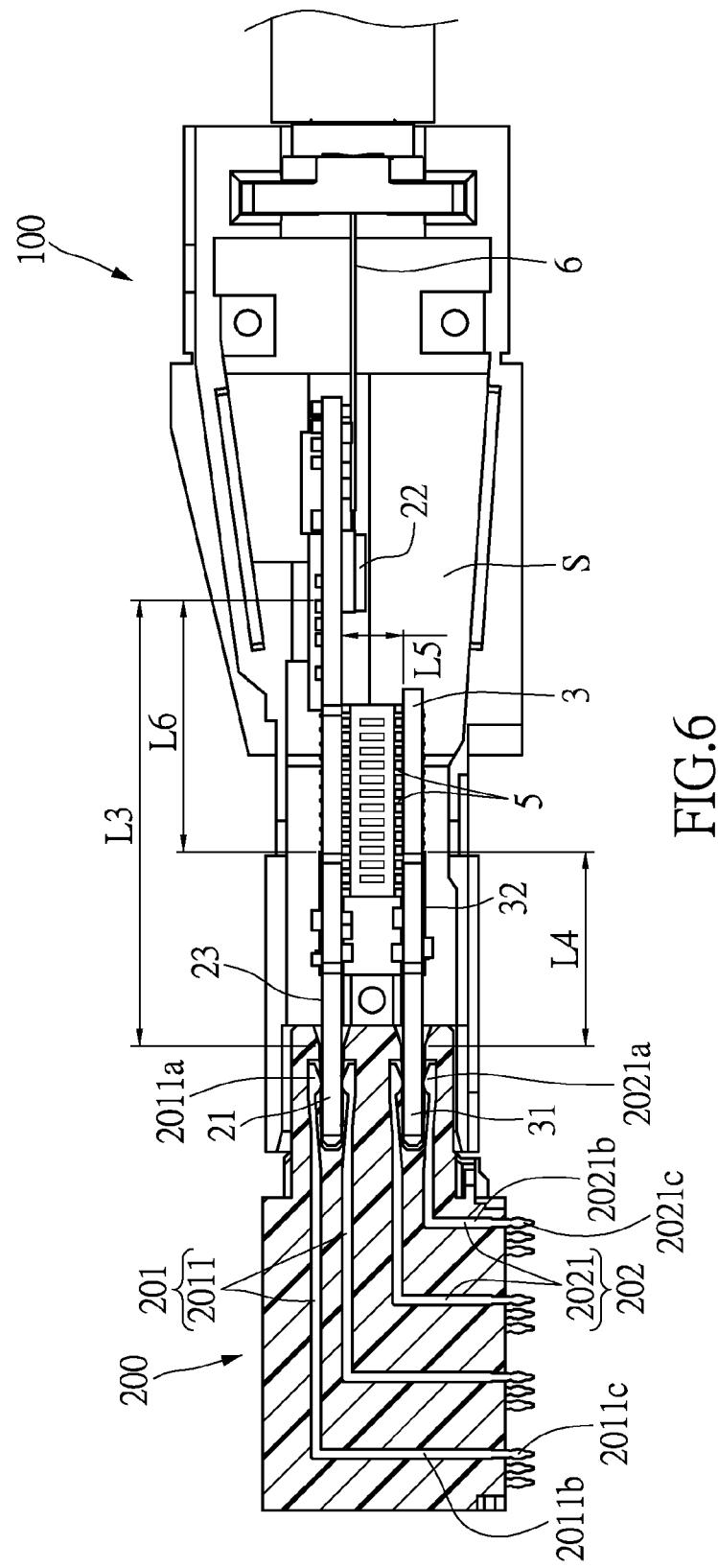
FIG. 6 shows a side cross-sectional view of a mated optical connector according to the present disclosure.

The output/input connector 200 includes a first set of terminals 201 (as shown in FIG. 6) and a second set of terminals 202 (as shown in FIG. 6). When the optical connector 100 of the present disclosure is mated with the output/input connector 200, the first contacts 21 of the first circuit board 2 are electrically connected to the first set of terminals 201, and the second contacts 31 of the second circuit board 3 are electrically connected to the second set of terminals 202. Since the high frequency connector 4 provides signal transmission between the first circuit board 2 and the second circuit board 3, electrical signals from the output/input connector 200 or optical signals from the optical fiber cable 6 can be converted by the single optical engine 22 of the first circuit board and transmitted respectively to the optical fiber cable 6 or output/input connector 200. Therefore, the optical connector 100 of the present disclosure requires only a single optical engine 22 for data transmission, not only reducing the production cost of the optical connector 100, but also solving the problems of limited transmission speed of conventional flexible cables 13', 14' (as shown in FIG. 2) and difficulty of quality control for soldering. Additionally, the present disclosure connects two circuit boards (the first circuit board 2 and the second circuit board 3) through a high frequency connector 4 such that the electrical signals can only be transmitted along the outer surfaces of the two circuit boards, but also the inner sides of the two circuit boards, greatly increasing the printing space on the two circuit boards, providing a more flexible printing condition. The transmission of electrical signals on the outer surface or the inner side is further detailed in FIG. 5 and in the following descriptions.

The following descriptions relate to specific embodiments of the present disclosure. FIG. 3 shows a perspective view of a non-mated assembled optical connector according to the present disclosure. FIG. 4 shows a perspective exploded view of a non-mated assembled optical connector according to the present disclosure. As shown in FIG. 3 and FIG. 4, the first circuit board 2 and the second circuit board 3 of the optical connector 100 are completely connected through a single high frequency connector 4 and disposed in the connector head 1. The connector head 1 completely encloses the first circuit board 2 and the second circuit board 3, effectively protecting the first circuit board 2, the second circuit board 3 and related components. The first circuit board 2 is disposed above (or below) the second circuit board 3 such that the first circuit board 2 and the second circuit board 3 have corresponding shapes. After the first circuit board 2 and the second circuit board 3 have been disposed in the connector head 1, a plurality of first contacts 21 and a plurality of second contacts 31 are exposed at the opening end F1 of the connector head 1. Additionally, the outer portion of the optical fiber cable 6 is an optical fiber sleeve (not labeled), the end of which is formed with a fixing element (not shown in the figures), providing stable fixture to the assembly end F2 such that the optical fiber cable 6 can be stably fixed to the connector head 1. In the present embodiment, the terminal-accommodating regions P are arranged on two sides of the insulation base 41. Therefore, when the first circuit board 2 and the second circuit board 3 are correspondingly connected to the top and bottom of the high frequency connector 4, the force is evenly applied on the two sides of the high frequency base 41 such that the first circuit board 2, the second circuit board 3 and the high frequency connector 4 are securely assembled. The circuit on the first circuit board 2 includes a first pattern 23, and a third pattern 24. The circuit on the second circuit board 3 includes a second pattern 32. The first pattern 23, the third pattern 24 and the second pattern 32 can be aligned with the terminal-free region B of the insulation base 41 (namely the central region of the insulation base 41). Therefore, the first circuit board 2 and the second circuit board 3 have large area for circuit printing, providing flexibility in circuit patterns. The first pattern 23 is a copper circuit extending from the first contacts 21 to the optical engine 22. The second pattern 32 is a copper circuit extending from the second contacts 31 to one of the connection terminals 5. The third pattern 24 is a copper circuit extending from one of the connection terminals 5 to the optical engine 22.

FIG. 5 shows an enlarged side cross-sectional view of a mated optical connector according to the present disclosure. FIG. 6 shows a side cross-sectional view of a mated optical connector according to the present disclosure. As shown in FIG. 4 and FIG. 5, the first circuit board 2 and the second circuit board 3 can be multi-layered circuit boards, the first circuit board 2 can have multiple first patterns 23 stacked on top of each other and multiple third patterns 24 stacked on top of each other, and the second circuit board 3 can have multiple second patterns 32 stacked on top of each other. Therefore, as shown in FIG. 5 and FIG. 6, when the optical connector 100 and the output/input connector 200 are electrically connected, the electrical signals coming from the first set of terminals 201 can go through different first contacts 21 of the first circuit board 2 and enter either the first pattern 23 on the outer surface, the first pattern embedded (not labeled) in the first circuit board 2, or the first pattern (not labeled) on the inner side. The electrical signal is then transmitted to the optical engine 22. Similarly, electrical signals coming from the second set of terminals 202 can go through different second contacts 31 of the second circuit board 3 and enter either the second pattern 32a on the outer surface, the second pattern embedded 32b in the second circuit board 2, or the second pattern 32c on the inner side. The electrical signal is then transmitted to an end of one of the connection terminals 5, and then transmitted from the other end of the connection terminal 5 to either the third pattern 24a on the outer surface of the first circuit board 2, a third pattern 24b embedded in the first circuit board 2 or a third pattern 24c on the inner side of the first circuit board 2, which in turn transmits the electrical signal to the optical engine 22. Specifically, the optical connector 100 of the present disclosure can have circuits on different layers connecting to the optical engine 22, so the circuit printing space is greatly increased and the printing condition is more flexible.

Referring to FIG. 4 and FIG. 6, the first and second sets of terminals 201, 202 of the output/input connector 200 respectively include a plurality of first terminals 2011 and a plurality of second terminals 2021. Each of the first terminals 2011 has a first contact portion 2011a, a first rear portion 2011c and a first main body 2011b therebetween. Each of the second terminals 2021 has a second contact portion 2021a, a second rear portion 2021c and a second main body 2021b therebetween. The first contact portion 2011a and the first rear portion 2011c are bent and formed at two respective ends of the first main body 2011b. The second contact portion 2021a and the second rear portion 2021c are bent and formed at two respective ends of the second main body 2021b. The first contact portions 2011a are electrically connected to the first contacts 21. The second contact portions 2021a are electrically connected to the second contacts 31. When the first contacts 21 receive electrical signals, the first circuit board 2 transmits the electrical signals to the optical engine 22, which in turn converts the received signals into optical signals and transmits them to the optical fiber cable 6. When the second contacts 31 receive electrical signals, the second circuit board 3 transmits the electrical signals through the high frequency connector 4 to the first circuit board 2, which in turn transmits the electrical signals to the optical engine 22, which in turn converts the received signals into optical signals and transmits them to the optical fiber cable 6. Conversely, when the optical fiber cable 6 transmits optical signals to the optical engine 22, the optical engine 22 coverts the optical signals into electrical signals, which is then transmitted to the first contacts 21 of the first circuit board 2 or to the high frequency connector 4 which in turn transmits the electrical signals to the second contacts 31 of the second circuit board 3.

The first set of terminals 201 of the output/input connector 200 has a greater length than the second set of terminals 202 does. The first pattern 23 has a greater length than the second pattern 32 does. If the length of the first pattern 23 is defined as L3, the length of the second pattern 32 is defined as L4, the length of the connector terminals is defined as L5, the length of the third pattern 24 is defined as L6, then the sum of the length of the first set of terminals 201 (distance from the first rear portion 2011c to the first contact portion 2011a, defined as L1) and L3 is substantially equal to the sum of the length of the second set of terminals 202 (distance from the second rear portion 2021c to the second contact portion 2021a, defined as L2), L4, L5 and L6. L1>L2 and L3>L4. Electrical signals from the output/input connector 200 received by the optical connector 100 pass through the same distance when transmitted by the first circuit board 2 and the second circuit board 3 to the optical engine 22. The different lengths of the first circuit board 2 and the second circuit board 3 is compensated for, and the bi-direction transmission of signals does not lag.

Referring to FIG. 4, the first circuit board 2 can have at least one heat dissipating pad 27 proximal to the optical engine 22. Specifically, the first circuit board 2 has at least one metal heat sink 26 proximal to the optical engine 22, and the at least one heat dissipating pad 27 is correspondingly disposed on the metal heat sink 26. The heat dissipating pad 27 can be made of heat conducting silicon gel, elastic metal, or elastic non-metal. In the present embodiment, preferably, the heat dissipating pad 27 is a highly compressable heat conducting silicon gel having high heat conductivity. The heat conducting silicon gel can be added with electrically insulating material having good heat conductivity. When the optical connector 100 of the present disclosure generates heat during operation, the heat dissipating pad 27 (heat conducting silicon gel) rapidly transfers heat to the connector head 1, which in turn rapidly dissipates heat into the ambience, such that heat dissipation is greatly improved. The connector head 1 can be made of metal.

Figure 7:
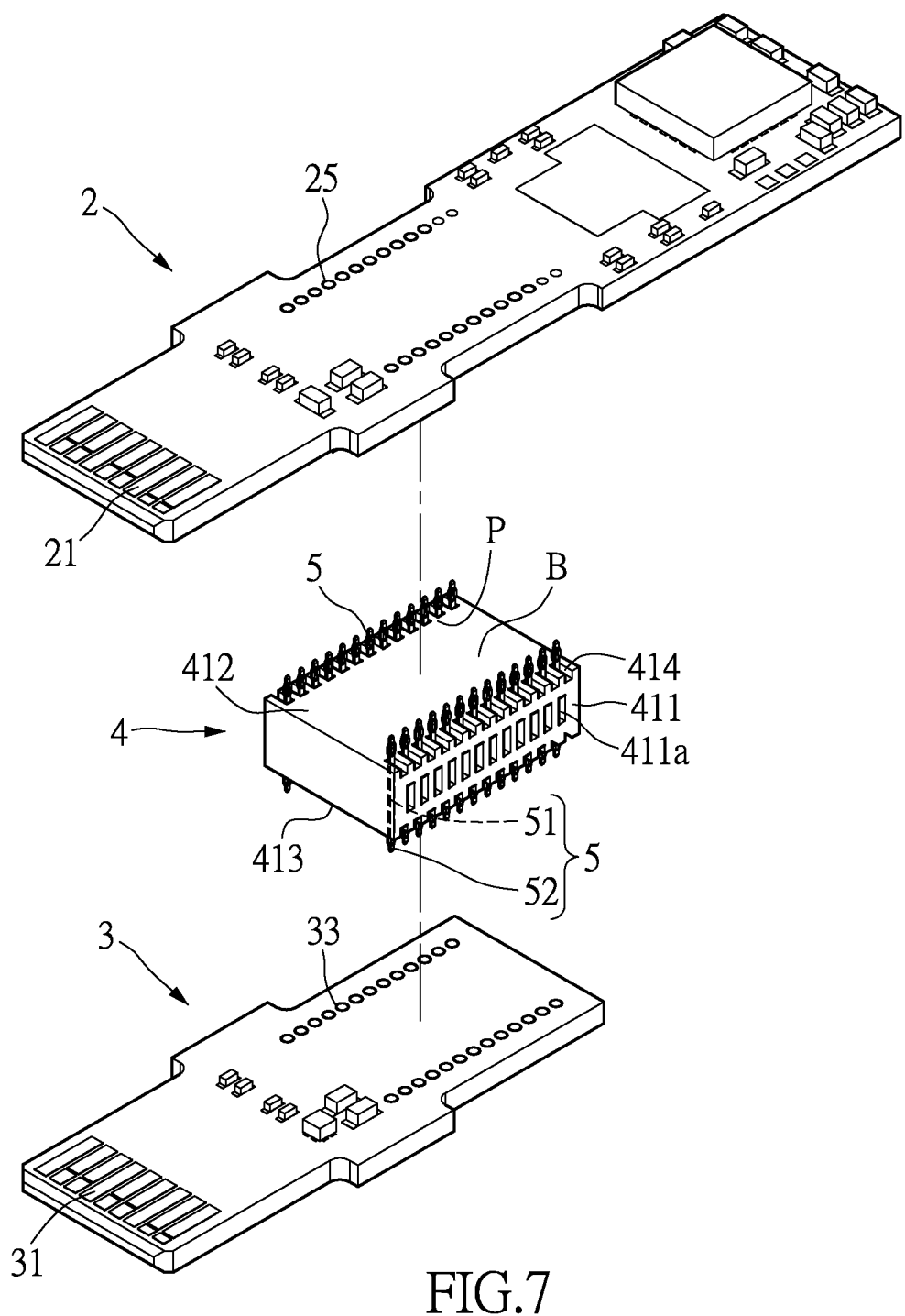
FIG. 7 shows a perspective exploded view of a high frequency connector according to the present disclosure.

FIG. 7 shows a perspective exploded view of a high frequency connector according to the present disclosure. As shown in FIG. 5 and FIG. 7, the high frequency connector 4 is disposed between the first circuit board 2 and the second circuit board 3, the insulation base 41 is integrally formed, a plurality of connection terminals 5 are arranged in two parallel lines along two sides of the first terminal face 412 and the second terminal face 413 of the insulation base 41. Each of the connection terminals 5 can include a fixing portion 51 and two leg portions 52. The fixing portion 51 is embedded in the insulation base 41. The two leg portions 52 extend respectively from the two ends of the fixing portion 51 and are exposed respectively outside the first terminal face 412 and the second terminal face 413 of the insulation base 41. The insulation base 41 is formed with a plurality of fixing openings 414 for accommodating the connection terminals 5. As shown in FIG. 5, each of the two leg portions 52 of each connection terminal 5 has a fish eye portion 521. When the first circuit board 2, the second circuit board 3 and the high frequency connector 4 are to be assembled, the two leg portions 52 of a connection terminal 5 of the high frequency connector 4 are respectively inserted into a first slot 25 of the first circuit board 2 and a second slot 33 of the second circuit board 3. Alternately, the two leg portions 52 of a connection terminal 5 can be soldered respectively into the first slot 25 of the first circuit board 2 and the second slot 33 of the second circuit board 3, but is not limited thereto.

Figure 10:
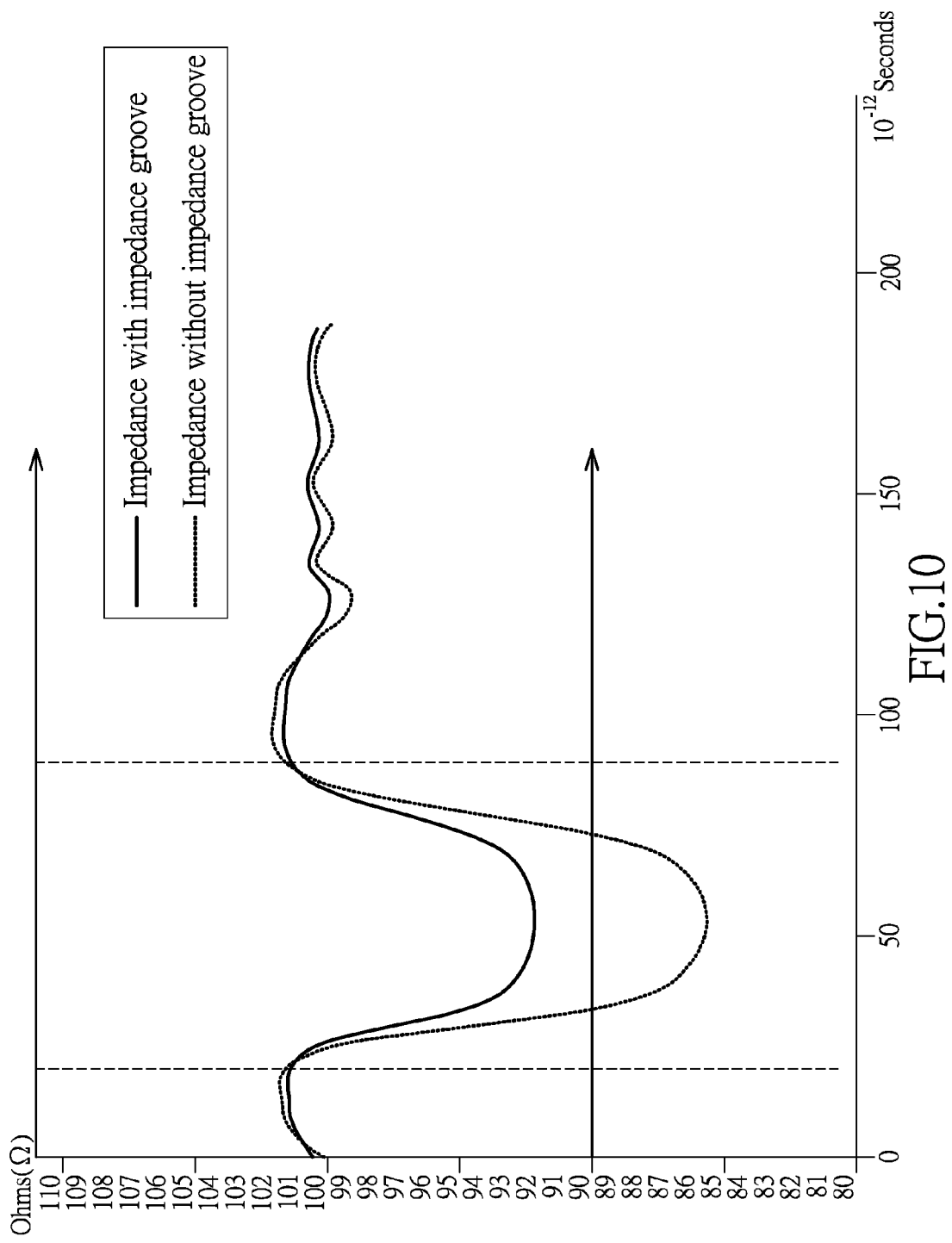
FIG. 10 shows the graph of the impedance of a high frequency connector according to the present disclosure.

The side surface 411 of the insulation base 41 can be formed with a plurality of impedance grooves 411a successively positioned with the connection terminals 5. For example, two neighboring connection terminals 5 have a impedance groove 411a therebetween (likewise, two neighboring impedance grooves 411a have a connection terminal 5 therebetween). The insulation base 41 can be made of industrial plastic resistant to high temperature. If the insulation base 41 is not formed with impedance grooves, when electrical signals pass through the high frequency connector, the capacitance is too high and the impedance is too low. If the insulation base 41 is formed with impedance grooves, effectively the impedance is increased, the resistance is decreased, the capacitance is decreased, and the inductance is increased. Therefore, when the high frequency connector 4 has impedance grooves, whether during high frequency or low frequency transmissions, the impedance is stably maintained at 100Ω±10% (as shown in FIG. 10). Therefore, the high frequency connector 4 of the present disclosure replaces industrial plastic with impedance grooves filled with insulating air to provide stable impedance. The industrial plastic used by the insulation base 41 can be but is not limited to poly 1,9-nonamethylene terephthalamide or Nylon 46'liquid crystal polymer.

Figure 8:
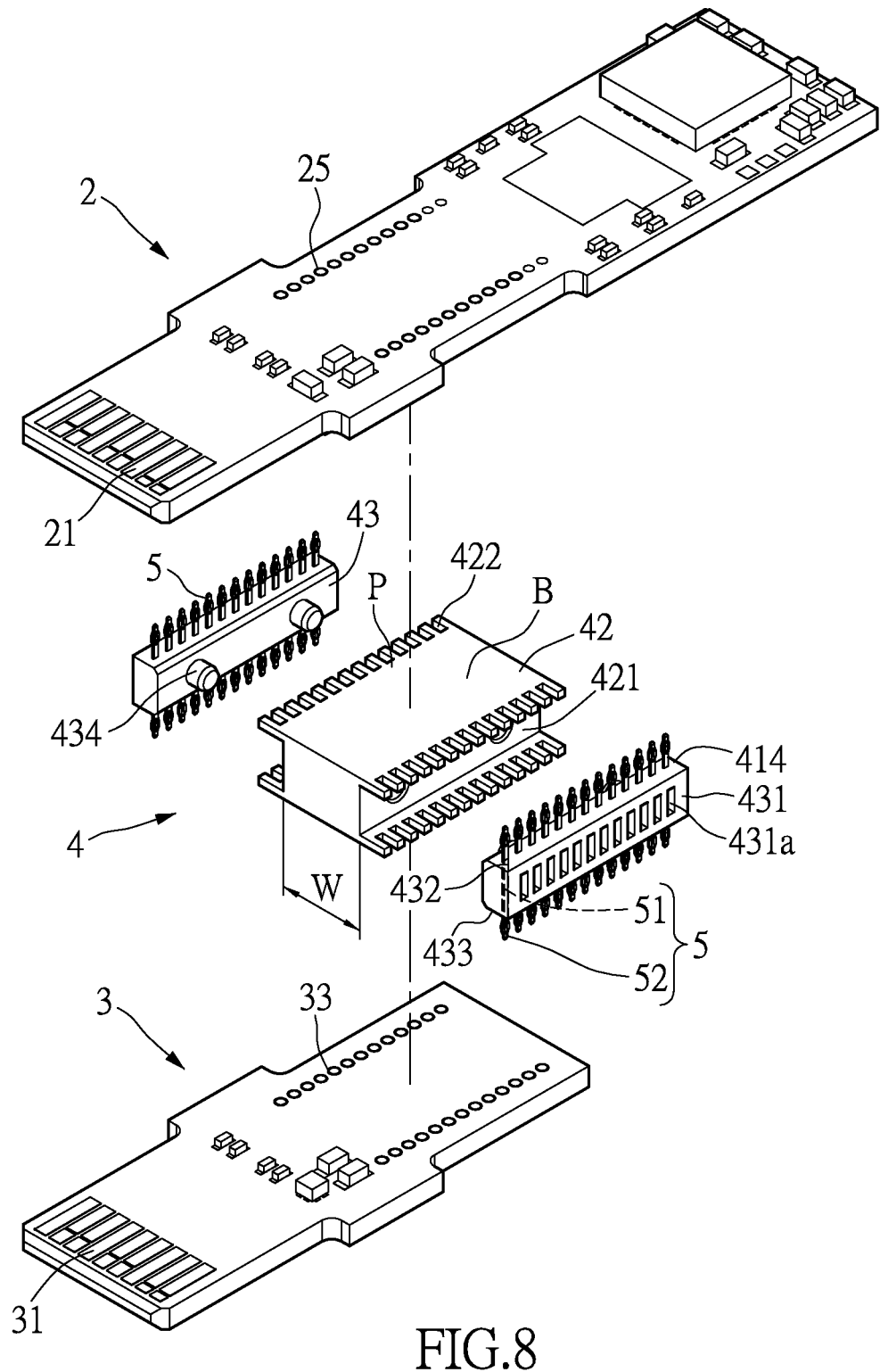
FIG. 8 shows a perspective exploded view of a high frequency connector according to another embodiment of the present disclosure.

FIG. 8 shows a perspective exploded view of a high frequency connector according to another embodiment of the present disclosure. The present embodiment differs from the embodiment shown in FIG. 7 in that the high frequency connector 4 of the present embodiment has three pieces. The insulation base 41 includes an inner base 42 and two fixture blocks 43. The two fixture blocks 43 engage opposite sides of the inner base 42. Each of the fixture blocks 43 has a peripheral block side surface 431 and a first block terminal face 432 and a second block terminal face 433 opposite each other. The block side surface 431 is adjacent to the first block terminal face 432 and the second block terminal face 433. Each of the fixture blocks 43 has a plurality of connection terminals 43 orderly arranged therein. The fixing portion 51 of each connection terminal 5 is embedded in a fixture block 43. The two leg portions 52 extend respectively from the two ends of the fixing portion 51 and are exposed respectively outside the first block terminal face 432 and the second block terminal face 433. As shown in the figure, the inner base 42 can be formed with a plurality of inner base fixing openings 422 such that the two leg portions 52 of each connection terminal 5 are fixed in the respective inner base fixing openings 422.

Opposite sides of the inner base 42 are each formed with an engagement groove 421 for accommodating the fixture blocks 43 therein. When assembling the first circuit board 2, the second circuit board 3 and the high frequency connector 4, an engagement block 434 of each of the two fixture blocks 43 can be disposed in the respective engagement groove 421 such that the inner base 42 and the two fixture blocks 43 form a complete high frequency connector 4. The engagement block 434 provides guidance and restriction such that the two fixture blocks 43 can securely be disposed in the respective engagement groove 421. Additionally, the high frequency connector 4 of the present embodiment has an I-shaped inner base 42, and the distance W between the engagement grooves 421 can be increased or decreased according to need. In other words, when demand requires, the high frequency connector 4 of the present disclosure needs to only change differently sized fixture blocks 43 to be applied in different fields. For example, the quantity, distance, length of the connection terminal 5 of the fixture block 43 can be altered according to need, greatly reducing production and maintenance cost. Moreover, the block side surface 431 of the each fixture block 43 can be formed with a plurality of impedance grooves 431a positioned successively between the connection terminals 5 such that the impedance during signal transmission is stably maintained at 100Ω±10% (as shown in FIG. 10).

Additionally, the circuit design of the two circuit boards (the first circuit board 2 and the second circuit board 3) can be altered accordingly to the distance W between the two engagement grooves. For example, when the distance W between the two engagement grooves 421 is small, the connection terminals 5 of the two fixture blocks 43 are close to each other. Accordingly, the terminal-accommodating region P is positioned at the central region of the insulation base 41, and the terminal-free region B is positioned at two sides of the inner base 42. Therefore, the circuits of the two circuit boards (the first circuit board 2 and the second circuit board 3) need to be designed on two sides of the two circuit boards.

Figure 9:
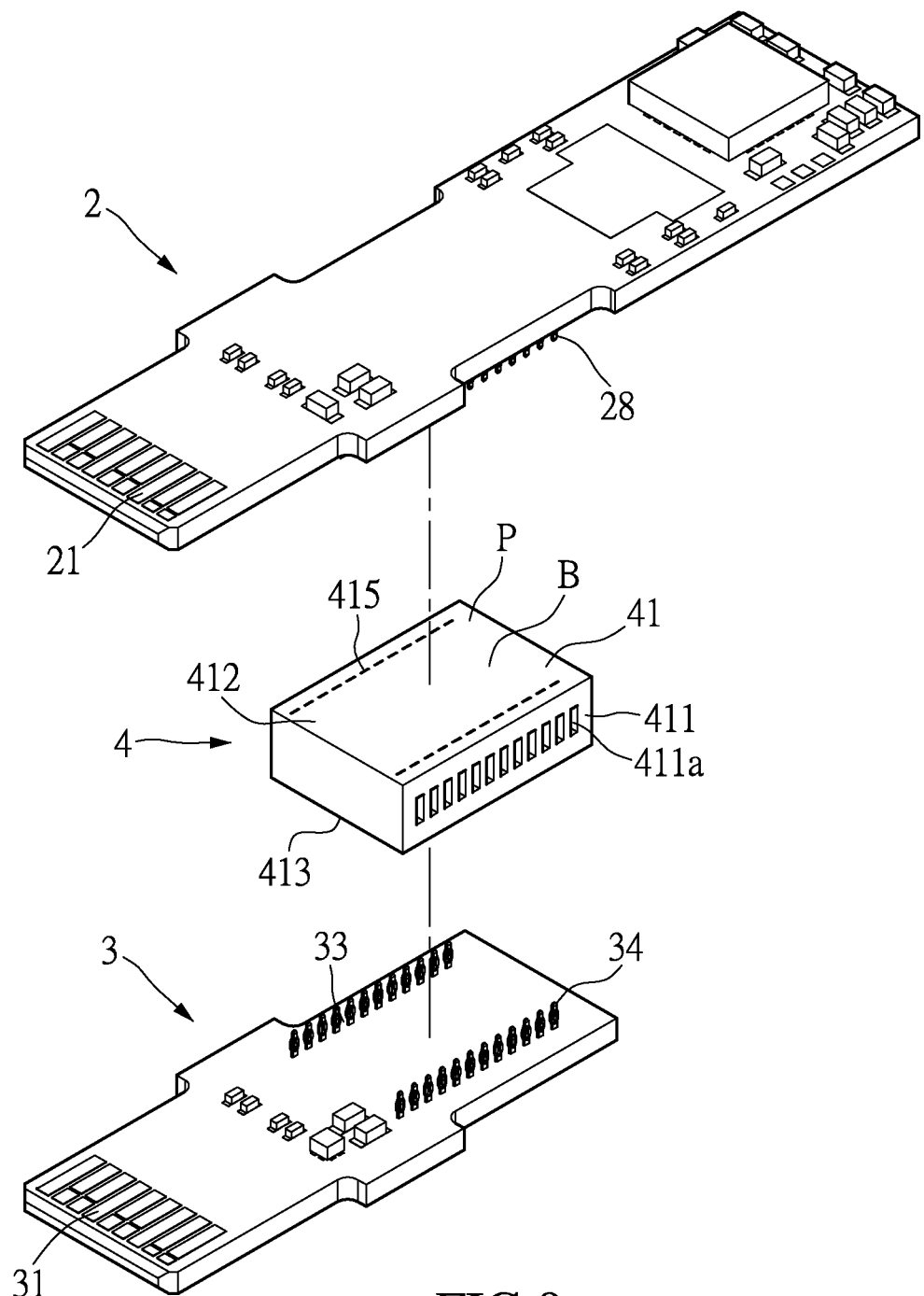
FIG. 9 shows a perspective exploded view of a high frequency connector according to yet another embodiment of the present disclosure.

FIG. 9 shows a perspective exploded view of a high frequency connector according to yet another embodiment of the present disclosure. The present embodiment is different from the embodiments shown in FIG. 7 and FIG. 8 in that the insulation base 41 is integrally formed as one body and is formed with a plurality of base slots 415, and the plurality of connection terminals 5 include a plurality of first connection terminals 28 and a plurality of second connection terminals 34. The first connection terminals 28 are disposed on the first circuit board 2, and the second connection terminals 34 are disposed on the second circuit board 3. When the first circuit board 2, the second circuit board 3 and the high frequency connector 4 are to be assembled, the first connection terminals 28 and the second connection terminals 34 need to be inserted into the respective base slots 415 such that the respective first connection terminals 28 and the second connection terminals 34 contact each other therein. Additionally, the side surface 411 of the insulation base 41 can be formed with a plurality of impedance grooves 411a positioned successively between the first connection terminals 28 and the second connection terminals 34, such that the impedance during signal transmission is stably maintained at 100Ω±10%.

FIG. 10 shows the graph of the impedance of a high frequency connector according to the present disclosure. As shown in FIG. 10, the high frequency connector 4 of the present disclosure is measured by a time domain reflectometer (TDR) which detects pulses reflected from discontinuities in impedance along the high frequency connector 4. The discontinuities in impedance can be results of material (such as industrial plastic) or geometrical properties. Specifically, because the detection time of a reflected pulse is proportional to the distance of the impedance discontinuity along the circuit, the time domain reflectometer measurement can be interpreted as impedance as function of circuit length in the high frequency connector 4. As shown in FIG. 10, when the high frequency connector 4 has impedance grooves 431a, 411a, the impedance of the high frequency connector 4 is consistently at 100Ω±10% when high frequency signals pass therethrough, which is in compliance with standard range of impedance required for high frequency signal transmission.

However, when the high frequency connector 4 of the present disclosure does not have impedance grooves 431a, 411a, the impedance is below 100Ω−10%, which is not suitable for high frequency signal transmission. In other words, the high frequency connector 4 of the present disclosure is suitable for high frequency signal transmission due to presence of the impedance grooves 431a, 411a.

The present disclosure also provides a bi-directional data transmission method of the optical connector 100, including: as shown in FIG. 3 and FIG. 4, providing an optical connector 100 having a first circuit board 2, a second circuit 3 board and a high frequency connector 4 electrically connected between the first circuit board 2 and the second circuit board 3, an output/input connector 200 having a first set of terminals 201 and a second set of terminals 202, wherein a plurality of connection terminals 5 passes through the high frequency connector 4, and when signals are being transmitted between the optical connector 100 and the output/input connector 200, a plurality of first contacts 21 of the first circuit board 2 is electrically connected to the first set of terminals 201, and a plurality of second contacts 31 of the second circuit board 3 is electrically connected to the second set of terminals 202; a first signal transmission path which uses the first contacts 21 of the first circuit board 2 to receive electrical signals from the first set of terminals 201, sends the electrical signals to an optical engine 22 of the first circuit board 2, uses the optical engine 22 to convert the electrical signals into optical signals, and sends the optical signals to an optical fiber cable 6, and at the same time, receives optical signals from the optical fiber cable 6, sends the optical signals to the optical engine 22 which converts the optical signals into electrical signals, and sends the electrical signals through the first contacts 21 to the first set of terminals 201; and a second signal transmission path which uses the second contacts 31 of the second circuit board 3 to receive electrical signals from the second set of terminals 202, sends the electrical signals to the high frequency connector 4, uses the high frequency connector 4 to send the electrical signals to the optical engine 22 of the first circuit board 2 at a high speed, uses the optical engine 22 to convert the electrical signals into optical signals, and sends the optical signals to an optical fiber cable 6, and at the same time, receives optical signals from the optical fiber cable 6, sends the optical signals to the optical engine 22 which converts the optical signals into electrical signals, uses the high frequency connector 4 to send the electrical signals to the second contacts 31 of the second circuit board 3 at a high speed, and sends the electrical signals to the second set of terminals 202. The terminal-free region B of the insulation base 41 of the high frequency connector 4 is for designing the first pattern 23 and the third pattern 24 of the first circuit board 2 and the second pattern 3 of the second circuit board 3. Specifically, if the distance between the first contacts 21 and the optical engine 22 is defined as L3, the distance of between the second contacts 31 and one of the connection terminals 5 is defined as L4, the distance of the connector terminals is defined as L5, the distance between one of the connector terminals 5 and the optical engine 22 is defined as L6, then the sum of the distance between the first rear portions 2011c of the first terminals of the first set of terminals 201 and the first contacts 21 and L3 is substantially equal to the distance between the second rear portions 2021c of the second terminals 2021 of the second set of terminals 202 and the second contacts 31, L4, L5 and L6. L1>L2, and L3>L4. Specifically, electrical signals from the first set of terminals 201 and the second set of terminals 202 are all sent to a single optical engine 22, and the first signal transmission path and the second signal transmission path have the same length. Therefore, when the optical connector 100 is electrically connected to the output/input connector 200, there is no lag in the bi-directional signal transmission between the optical connector 100 and the output/input connector 200.

Figure 11:
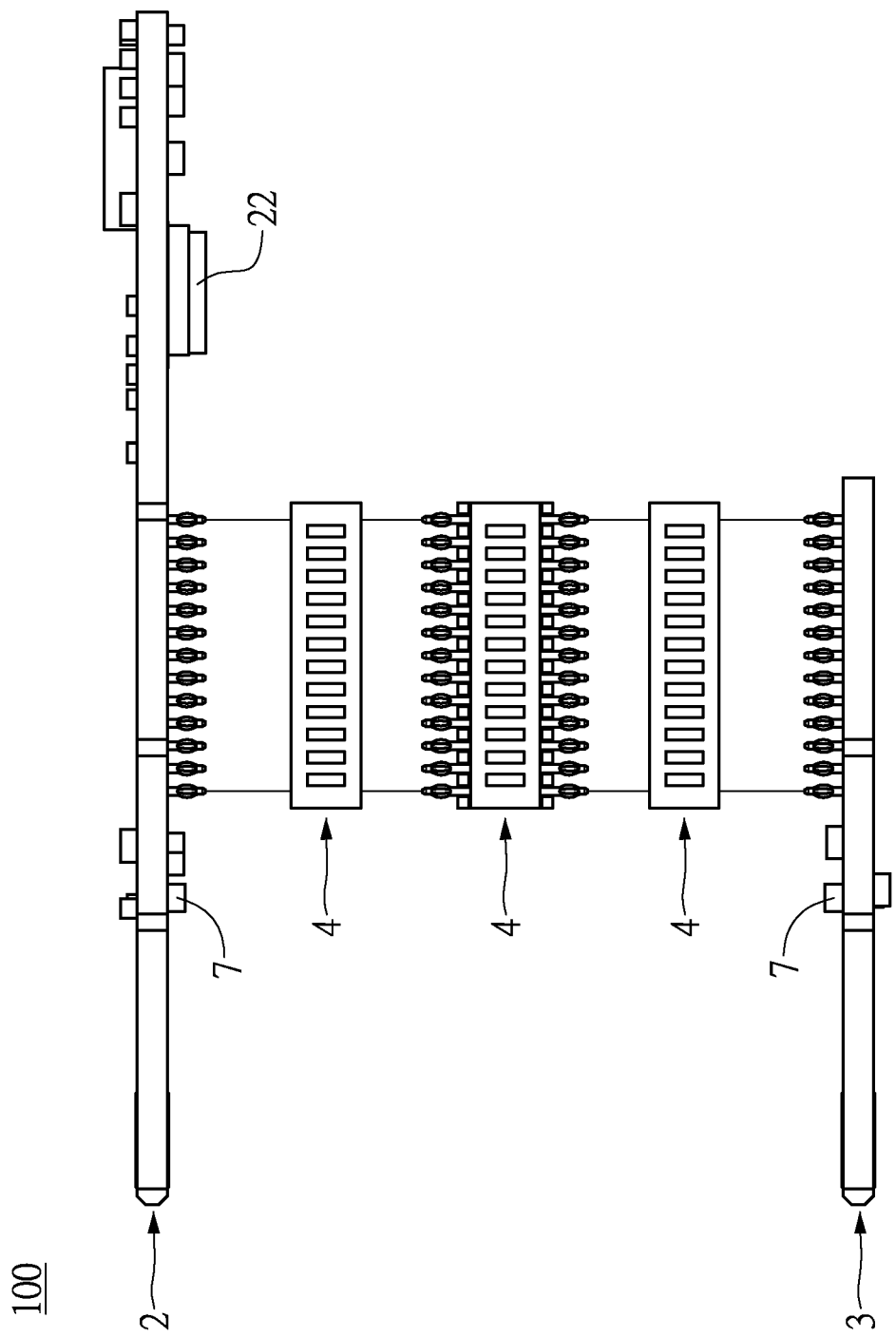
FIG. 11 shows a perspective exploded view of an embodiment of the present disclosure having a plurality of high frequency connectors.
Figure 12:
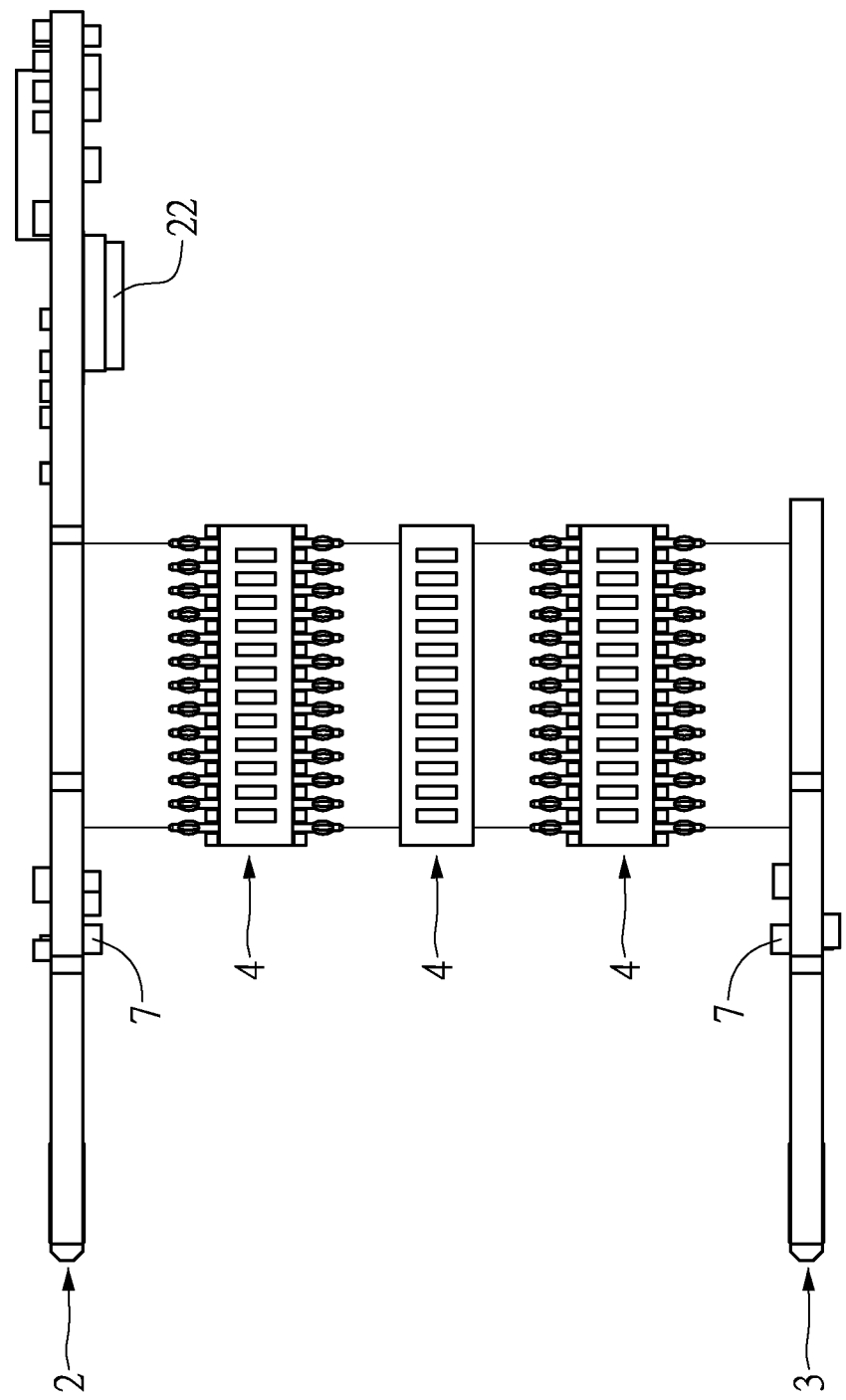
FIG. 12 shows a perspective exploded diagram of another embodiment of the present disclosure having a plurality of high frequency connectors.

FIG. 11 shows a perspective exploded view of an embodiment of the present disclosure having a plurality of high frequency connectors. FIG. 12 shows a perspective exploded diagram of another embodiment of the present disclosure having a plurality of high frequency connectors. As shown in FIG. 11 and FIG. 12, the optical connector 100 of the present disclosure can have a plurality of high frequency connectors 4 stacked on top of each other between the first circuit board 2 and the second circuit board 3. Therefore, when a bulky and thick electronic component 7 needs to be disposed on the first circuit board 2, the second circuit board 3 or both, stacked high frequency connectors 4 can adjust the distance between the first circuit board 2 and the second circuit board 3. The quantity of the stacked high frequency connectors 4 is not limited, and the high frequency connectors 4 can be embodied by any of the embodiments shown in FIG. 7, FIG. 8 and FIG. 9. Specifically, as shown in FIG. 11, in the present embodiment, the optical connector 100 has three high frequency connectors 4 stacked on top of each other, wherein the middle high frequency connector 4 is an embodiment shown in FIG. 9, and the top and bottom high frequency connectors are embodiments shown in either FIG. 7 or FIG. 8, configured with the first circuit board 2 and the second circuit board 3 of FIG. 7 or FIG. 8 to complete the optical connector 100. Additionally, as shown in FIG. 12, in the present embodiment, the optical connector 100 has three frequency connectors 4 stacked on top of each other, but the middle high frequency connector 4 is an embodiment shown in FIG. 7 or FIG. 8, and the top and bottom high frequency connectors 4 are embodiments shown in FIG. 9, configured with the first circuit board 2 and the second circuit board 3 of FIG. 9 to complete the optical connector.

The present disclosure has the following improvements. The optical connector of the present disclosure connects two circuit boards through a high frequency connector, not only saves production cost by using only one optical engine, but also improves upon difficult quality control during production. Electrical signals can selectively pass through outer surfaces or inners sides of the two circuit boards to the same optical engine, greatly increasing the printing space of the two circuit boards. The transmission distance via the first circuit board and the second circuit board are the same such that no lag exists during bi-directional signal transmission. The high frequency connector can use different fixture blocks to adjust the amount of connection terminals, distance therebetween and lengths thereof, saving production and maintenance costs.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. An optical connector for bi-directional data transmission with an output/input connector having a first set of terminals and a second set of terminals, the optical connector comprising:
   a connector head, having an accommodating space and formed with an opening end and an assembly end;
   a first circuit board disposed in the accommodating space and having a plurality of first contacts proximal to the opening end and an optical engine proximal to the assembly end, wherein the first contacts are electrically connected to the first set of terminals;
   a second circuit board disposed in the accommodating space and having plurality of second contacts proximal to the opening end, wherein the second contacts are electrically connected to the second set of terminals;
   a high frequency connector disposed between the first circuit board and the second circuit board and having an insulation base, wherein the insulation base has a peripheral side surface and a first terminal face and a second terminal face opposite each other, the side surface is adjacent to the first terminal face and the second terminal face, the first terminal face and the second terminal face have at least one corresponding terminal-accommodating region, and a plurality of connection terminals pass through the at least one corresponding terminal-accommodating region; and
   an optical fiber cable electrically connected to the optical engine through the assembly end of the connector head;
   wherein the insulation base includes an inner base and two fixture blocks, the two fixture blocks engage with respective side surfaces of the inner base, each of the fixture blocks has a block side surface and a first block terminal face and second block terminal face opposite each other, the block side surface is adjacent to the first block terminal face and the second block terminal face, each of the connection terminals include a fixing portion and two leg portions, the fixing portion is embedded in the fixture block, the two leg portions extend respectively from the two ends of the fixing portion and are exposed at the first block terminal face and the second block terminal face.

2. The optical connector according to claim 1, wherein the first circuit board and the second circuit board are multi-layered circuit boards, a first pattern and a third pattern of the first circuit board, and a second pattern of the second circuit board each correspond to a terminal-free region of the insulation base, the first pattern extends from the first contacts to the optical engine, the second pattern extends from the second contacts to one of the connection terminals, and the third pattern extends from one of the connection terminals to the optical engine.

3. The optical connector according to claim 2, wherein the first set of terminals has a greater length than the second set of terminals do, the first pattern has a greater length than the second pattern does, the length of the first pattern is defined as L3, the length of the second pattern is defined as L4, the length of connection terminals is defined as L5, the length of the third pattern is defined as L6, and the sum of the length of the first set of terminals and L3 is substantially equal to the sum of the length of the second set of terminals, L4, L5 and L6.

4. The optical connector according to claim 1, wherein each of the connection terminals includes a fixing portion and two leg portions, the fixing portion is embedded in the insulation base, the two leg portions extend respectively from the two ends of the fixing portion and are exposed at the first terminal face and the second terminal face.

5. The optical connector according to claim 4, wherein the insulation base is formed with a plurality of fixing openings, the connection terminals are configured respectively in the fixing openings, the side surface is formed with a plurality of impedance grooves, and the impedance grooves are arranged successively between the connection terminals.

6. The optical connector according to claim 1, wherein the inner base is formed with a plurality of inner base fixing openings, opposite side surfaces of the inner base each have an engagement groove, the two fixture blocks each have an engagement block for engagement with the respective engagement groove, the two leg portions of the connection terminals are respectively configured in the inner base fixing openings, the block side surfaces are formed with a plurality of impedance grooves arranged successively between the connection terminals.

7. The optical connector according to claim 4 or 1, wherein the leg portions of the connection terminals each have a fish eye portion, the two leg portions on one of the connection terminals respectively engage with, or are soldered to, a first slot of the first circuit board and a second slot of the second circuit board.

8. The optical connector of claim 1, wherein the connection terminals include a plurality of first connection terminals and a plurality of second connection terminals, the first connection terminals are disposed on the first circuit board, the second connection terminals are disposed on the second circuit board, the insulation base is formed with a plurality of base slots, and the first connection terminals and the respective second connection terminals pass respectively through the base slots.

9. The optical connector according to claim 1, wherein the optical connector includes a plurality of high frequency connectors stacked on top of each other.

10. The optical connector according to claim 1, wherein the first circuit board has at least one heat dissipating pad disposed proximal to the optical engine.

11. A high frequency connector, for installment between a first circuit board having an optical engine and a second circuit board of an optical connector, comprising:
an insulation base having a peripheral side surface and a first terminal face and a second terminal face opposite each other, wherein the side surface is adjacent to the first terminal face and the second terminal face, and the first terminal face and the second terminal face have at least one corresponding terminal-accommodating region; and
a plurality of connection terminals, passing through the at least one corresponding terminal-accommodating region, the optical engine electrically connected to an optical fiber cable;
wherein each of the connection terminals includes a fixing portion and two leg portions, the fixing portion is embedded in the insulation base, and the two leg portions extend respectively from two ends of the fixing portion and are exposed at the first terminal face and the second terminal face;
wherein the insulation base is formed with a plurality of fixing openings, the connection terminals are configured respectively in the fixing openings, the side surface is formed with a plurality of impedance grooves, and the impedance grooves are arranged successively between the connection terminals.

12. The high frequency connector according to claim 11, wherein the insulation base includes an inner base and two fixture blocks, the two fixture blocks engage with respective side surfaces of the inner base, each of the fixture blocks has a block side surface and a first block terminal face and second block terminal face opposite each other, the block side surface is adjacent to the first block terminal face and the second block terminal face, each of the connection terminals include a fixing portion and two leg portions, the fixing portion is embedded in the fixture block, the two leg portions extend respectively from the two ends of the fixing portion and are exposed at the first block terminal face and the second block terminal face.

13. The high frequency connector according to claim 12, wherein the inner base is formed with a plurality of inner base fixing openings, opposite side surfaces of the inner base each have an engagement groove, the two fixture blocks each have an engagement block for engagement with the respective engagement groove, the two leg portions of the connection terminals are respectively configured in the inner base fixing openings, the block side surfaces are formed with a plurality of impedance grooves arranged respectively to the positions of the connection terminals.

14. The high frequency connector according to claim 11 or 12, wherein the leg portions of the connection terminals each have a fish eye portion, the two leg portions on one of the connection terminals respectively engage with, or are soldered to, a first slot of the first circuit board and a second slot of the second circuit board.

15. The high frequency connector according to claim 11, wherein the connection terminals include a plurality of first connection terminals and a plurality of second connection terminals, the first connection terminals are disposed on the first circuit board, the second connection terminals are disposed on the second circuit board, the insulation base is formed with a plurality of base slots, and the first connection terminals and the respective second connection terminals pass respectively through the base slots.

16. A bi-directional signal transmission method of an optical connector, comprising:
providing an optical connector for mating with an output/input connector, wherein the output/input connector includes a first set of terminals and a second set of terminals, the optical connector includes a first circuit board, a second circuit board and a high frequency connector electrically connected between the first circuit board and the second circuit board, a plurality of first contacts on the first circuit board are electrically connected to the first set of terminals, a plurality of second contacts on the second circuit board are electrically connect to the second set of terminals, and a plurality of connection terminals pass through the high frequency connector;
transmitting a first signal through a first signal transmission path, wherein the first contacts of the first circuit board receive electrical signals from the first set of terminals, the electrical signals are directly transmitted to an optical engine of the first circuit board, the optical engine converts the electrical signals to optical signals and transmits the optical signals to an optical fiber cable, and at the same time, optical signals from the optical fiber cable are transmitted to the optical engine, the optical engine converts the optical signals to electrical signals, and the electrical signals are directly transmitted to the first set of terminals through the first contacts; and
transmitting a second signal through a second signal transmission path, wherein the second contacts of the second circuit board receives electrical signals from the second set of terminals, the electrical signals are transmitted to the high frequency connector which in turn transmits the electrical signals to the optical engine of the first circuit board, the optical engine converts the electrical signals to optical signals and transmits the optical signals to the optical fiber cable, and at the same time, optical signals from the optical fiber cable are transmitted to the optical engine, the optical engine converts the optical signals to electrical signals, and the electrical signals are transmitted to the second contacts through the high frequency connector, and then transmitted to the second set of terminals;

wherein electrical signals from the first set of terminals and the second set of terminals are transmitted to a single optical engine, and the first signal transmission path and the second signal transmission path have the same length.

17. The bi-directional signal transmission method according to claim 16, wherein the high frequency connector includes an insulation base whose terminal-free region corresponds to a first pattern and a third pattern of the first circuit board and a second pattern of the second circuit board, the first pattern extends from the first contacts to the optical engine, the second pattern extends from the second contacts to one of the connection terminals, and the third pattern extends from one of the connection terminals to the optical engine.

18. The bi-direction signal transmission method according to claim 17, wherein distances traveled by electrical signals from the first contacts to the optical engine are defined as $L3$, distances traveled by electrical signals from the second contacts to one of the connection terminals is defined as $L4$, distances traveled by electrical signals from one end of one of the connection terminals to the other end of the connection terminal is defined as $L5$, distances traveled by electrical signals from the other end of one of the connection terminals to the optical engine is defined as $L6$, the sum of distance traveled by electrical signals from first set of terminals to the first contacts and $L3$ is substantially equal to of the sum of distances traveled by electrical signals from the second set of terminals to the second contacts, $L4$, $L5$ and $L6$.

* * * * *